(12) United States Patent
Katayama et al.

(10) Patent No.: US 8,004,381 B2
(45) Date of Patent: Aug. 23, 2011

(54) LAMINATED DEVICE

(75) Inventors: Yasuhisa Katayama, Tottori (JP); Tohru Umeno, Tottori (JP); Takeshi Tachibana, Tottori (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 12/307,433

(22) PCT Filed: Jul. 5, 2007

(86) PCT No.: PCT/JP2007/063500
§ 371 (c)(1),
(2), (4) Date: Jun. 9, 2009

(87) PCT Pub. No.: WO2008/004633
PCT Pub. Date: Jan. 10, 2008

(65) Prior Publication Data
US 2010/0033286 A1 Feb. 11, 2010

(30) Foreign Application Priority Data
Jul. 5, 2006 (JP) .................. 2006-185669

(51) Int. Cl.
*H01F 5/00* (2006.01)
*H01F 27/28* (2006.01)
*H01F 27/24* (2006.01)
*B32B 9/00* (2006.01)
*C04B 35/26* (2006.01)

(52) U.S. Cl. ........ 336/200; 336/223; 336/232; 336/233; 336/234; 428/692; 252/62.6; 252/62.62

(58) Field of Classification Search .......... None
See application file for complete search history.

(56) References Cited

U.S. PATENT DOCUMENTS

| | | | | |
|---|---|---|---|---|
| 5,476,728 A * | 12/1995 | Nakano et al. | ................. | 428/815 |
| 6,489,877 B1 * | 12/2002 | Yamamoto et al. | ........... | 336/200 |
| 6,826,031 B2 * | 11/2004 | Nagai et al. | ................... | 361/305 |
| 6,917,274 B2 * | 7/2005 | Hong et al. | ................... | 336/200 |
| 2001/0032383 A1 * | 10/2001 | Haratani et al. | ............. | 29/25.42 |
| 2004/0046631 A1 * | 3/2004 | Sakakura et al. | ............. | 336/200 |
| 2004/0108934 A1 * | 6/2004 | Choi et al. | .................... | 336/200 |

FOREIGN PATENT DOCUMENTS

| | | |
|---|---|---|
| JP | 56-155516 A | 12/1981 |
| JP | 03-097211 A | 4/1991 |
| JP | 06-077022 A | 3/1994 |
| JP | 06-224043 A | 8/1994 |
| JP | 08-064421 A | 3/1996 |
| JP | 2005-268455 A | 9/2005 |
| WO | 2007/088914 A1 | 8/2007 |

OTHER PUBLICATIONS

Chinese Office Action dated Dec. 6, 2010.

* cited by examiner

*Primary Examiner* — Anh T Mai
*Assistant Examiner* — Mangtin Lian
(74) *Attorney, Agent, or Firm* — Sughrue Mion, PLLC

(57) ABSTRACT

A laminated device comprising pluralities of magnetic ferrite layers, conductor patterns each formed on each magnetic ferrite layer and connected in a lamination direction to form a coil, and a non-magnetic ceramic layer formed on at least one magnetic ferrite layer such that it overlaps the conductor patterns in a lamination direction, the non-magnetic ceramic layer comprising as main components non-magnetic ceramics having higher sintering temperatures than that of the magnetic ferrite, and further one or more of Cu, Zn and Bi in the form of an oxide.

11 Claims, 12 Drawing Sheets

LAMINATED DEVICE

CROSS REFERENCE TO RELATED APPLICATIONS

This application is a National Stage of International Application No. PCT/JP2007/63500 filed Jul. 5, 2007, claiming priority based on Japanese Patent Application No. 2006-185669 filed on Jul. 5, 2006, the contents of all of which are incorporated herein by reference in their entirety.

FIELD OF THE INVENTION

The present invention relates to a laminated device such as a coil-containing laminated inductor, etc., particularly to a laminated device having excellent characteristics and reduced internal stress free from delamination and cracking.

BACKGROUND OF THE INVENTION

As power supply circuits for small electronic appliances such as cell phones, portable information terminals (PDA), note-type personal computers, digital cameras, etc., switching regulators (DC-DC converters) suffering less power loss in voltage conversion are widely used. Passive elements such as inductors, capacitors, etc. used in DC-DC converter circuits should be made smaller to reduce an area occupied by the power supply circuit.

Because the switching frequencies of DC-DC converters have been increased to improve their power efficiency and performance, inductors and capacitors contained in them have smaller constants, making it possible to miniaturize these parts. Thus, the inductors have been changed from a conventional coil type to a laminate type. A laminated inductor is produced by integrally laminating a magnetic sheet or paste of soft ferrite with a conductive paste comprising a high-conductive metal or alloy of Ag, Cu, etc. for forming internal electrodes (conductor patterns), sintering the resultant laminate, printing or transferring a paste for external electrodes on the sintered body, and baking the resultant electrodes.

The DC-DC converters need inductors having stable inductance even at a high frequency or in a strong magnetic field, and excellent DC superposition characteristics. In some cases, the inductors are required to have non-linear inductance to DC current.

With respect to DC superposition characteristics, it is required that soft ferrite used for inductors is not easily saturated even in a strong magnetic field, namely has a high saturation magnetic flux density Bs. Mn—Zn ferrite is known as soft ferrite having high Bs, but its low electric resistance makes it unsuitable for lamination. Accordingly, Ni—Zn ferrite, Ni—Cu—Zn ferrite, Mg—Zn ferrite, etc., which have high electric resistance despite lower Bs than Mn—Zn ferrite, are used.

The laminated inductors suffer several problems. The first problem is that the magnetic permeability of ferrite changes when strain is added. Such phenomenon is called "magnetostriction." Main factors of applying strain to the ferrite are (a) compression stress generated by the curing shrinkage of a resin in a resin molding, (b) stress generated by the difference in a linear thermal expansion coefficient between an inductor and a printed circuit board, and (c) internal stress generated by the difference in a linear thermal expansion coefficient between the ferrite and an internal electrode metal. With respect to the linear thermal expansion coefficient, the ferrite is about +10 ppm/° C., and Ag is about +20 ppm/° C.

Internal stress in the laminated inductor deteriorates the magnetic characteristics such as inductance and quality coefficient (Q value) of ferrite, and heat shock in a soldering step, etc. generates cracks in the device. As a result, the laminated inductor has uneven performance and low reliability.

To suppress the variation of characteristics due to magnetostriction, JP 8-64421 A proposes a laminated inductor, in which carbon paste layers between magnetic layers are caused to disappear to form void layers for stress relaxation. However, it has been found that the formation of void layers is not sufficient for stress relaxation, and that voids lower the strength of the laminated inductor. In addition, a gas generated during eliminating the carbon paste causes the delamination (peeling of layers) of the laminated inductor and the cracking of ferrite. The delamination and cracking are likely to permit a plating liquid, etc. to intrude into the laminated inductor, causing the short-circuiting of conductor patterns.

JP 56-155516 A proposes an open-magnetic-path-type inductor comprising non-magnetic, insulating layers interposed between magnetic layers to have magnetic gaps in a magnetic circuit for improving DC superposition characteristics. However, JP 56-155516 A does not consider the variation of magnetic properties by internal stress at all. In addition, because the non-magnetic, insulating layers reach an outer surface of this inductor, a plating liquid, etc. are likely to intrude into the inductor through cracks and delaminated portions in interfaces between the magnetic layers and the non-magnetic insulating layers, causing the short-circuiting of conductor patterns.

OBJECT OF THE INVENTION

Accordingly, an object of the present invention is to provide a laminated device having stable characteristics such as inductance, a Q value, etc., and excellent DC superposition characteristics, with internal-electrode-induced residual stress reduced, and delamination and cracking suppressed.

DISCLOSURE OF THE INVENTION

The laminated device of the present invention comprises pluralities of magnetic ferrite layers, conductor patterns each formed on each magnetic ferrite layer and connected in a lamination direction to form a coil, and a non-magnetic ceramic layer formed on at least one magnetic ferrite layer such that it overlaps the conductor patterns in a lamination direction, the non-magnetic ceramic layer comprising as main components non-magnetic ceramics having higher sintering temperatures than that of the magnetic ferrite, and further one or more of Cu, Zn and Bi in the form of an oxide.

In the first embodiment of the present invention, the non-magnetic ceramic layer is in a doughnut shape, at least one periphery of which extends more than the corresponding peripheries of the conductor patterns in a plane direction of the magnetic ferrite layer. A portion of the non-magnetic ceramic layer extending from the periphery of the conductor pattern may be as long as about ¼ to 4 times the width of the conductor pattern. The doughnut-shaped, non-magnetic ceramic layer provides larger inductance to the laminated device than a non-magnetic ceramic layer covering an entire region inside the coil does. The doughnut may be partially cut off like a Landolt ring.

In the second embodiment of the present invention, the non-magnetic ceramic layer is in a plate shape covering at least a region inside the conductor patterns. In this case, the non-magnetic ceramic layer preferably overlaps at least an inner peripheral portion of the conductor pattern in a lamination direction. A periphery of the non-magnetic ceramic layer may be positioned inside or outside the outer periphery of the conductor pattern.

In any embodiment, the non-magnetic ceramic layer need not be formed on all magnetic ferrite layers, but may be formed on at least one magnetic ferrite layer. For instance, (a) one non-magnetic ceramic layer may be formed in a lamination-direction center portion of the coil, (b) a pair of non-magnetic ceramic layers may be formed at both ends of the coil in a lamination direction, (c) a non-magnetic ceramic layer may be formed at a center and both ends of the coil in a lamination direction, (d) non-magnetic ceramic layers may be formed between every other conductor patterns, or (e) non-magnetic ceramic layers may be formed between all conductor patterns.

The non-magnetic ceramic layers according to the first and second embodiments may be combined. Namely, a doughnut-shaped, non-magnetic ceramic layer may be formed on at least one magnetic ferrite layer, and a plate-shaped, non-magnetic ceramic layer covering a region inside the conductor pattern may be formed on at least another magnetic ferrite layer.

Because the non-magnetic ceramic layer has a different linear thermal expansion coefficient from that of the conductor pattern, stress distribution change by the formation of the non-magnetic ceramic layer should be taken into consideration. As a result of intensive investigation, it has been found that when a non-magnetic ceramic layer is formed inside both peripheries of the conductor patterns, stress is concentrated in peripheral portions of the non-magnetic ceramic layer, resulting in a reduced effect of stress relaxation. The concentration of stress can be avoided by extending both peripheries of the non-magnetic ceramic layer from both peripheries of the conductor patterns in a plane direction such that the peripheries of the conductor patterns are sufficiently separate from the peripheries of the non-magnetic ceramic layer, thereby preventing the cracking of the magnetic ferrite layers. The conductor patterns are preferably sandwiched by the non-magnetic ceramic layers, such that the conductor patterns are positioned substantially at a plane-direction center of the non-magnetic ceramic layers adjacent in a lamination direction.

When the non-magnetic ceramic layer reaches an external surface of the laminated device, a plating liquid, etc. are likely to intrude into the laminated device because of cracking or delamination at interfaces between the magnetic ferrite layers and the non-magnetic ceramic layer. Accordingly, the non-magnetic ceramic layer is preferably not exposed outside the laminated device.

The connection of the conductor patterns in a lamination direction is preferably achieved by a conductor filled in via-holes of the magnetic ferrite layers and the non-magnetic ceramic layer.

Using a non-magnetic ceramic having a linear thermal expansion coefficient close to that of the magnetic ferrite, stress applied to the magnetic ferrite is reduced. The linear thermal expansion coefficient is +9.0 ppm/° C. to +11.0 ppm/° C. for $ZrO_2$, +4.0 ppm/° C. to +5.0 ppm/° C. for $ZrSiO_4$, +7.0 ppm/° C. to +8.0 ppm/° C. for $Al_2O_3$, and +5.5 ppm/° C. to +6.5 ppm/° C. for $3Al_2O_3$-$2SiO_2$. Accordingly, the non-magnetic ceramic layer is preferably made of any one of $ZrO_2$, $ZrSiO_4$, $Al_2O_3$, and $3Al_2O_3$-$2SiO_2$. Among them, $ZrO_2$ or $ZrSiO_4$, which does not react with the magnetic ferrite to form a spinel-type compound, is preferable. The non-magnetic ceramic is preferably formed by $ZrO_2$ powder having an average particle size of 0.5-3 μm.

The magnetic ferrite layer is preferably made of a spinel-type ferrite comprising as main components Fe, Ni and Zn, part of which may be substituted by Cu, and the spinel-type ferrite preferably contains Bi as a sub-component.

DESCRIPTION OF THE PREFERRED EMBODIMENTS

[1] First Embodiment

Figure 1:
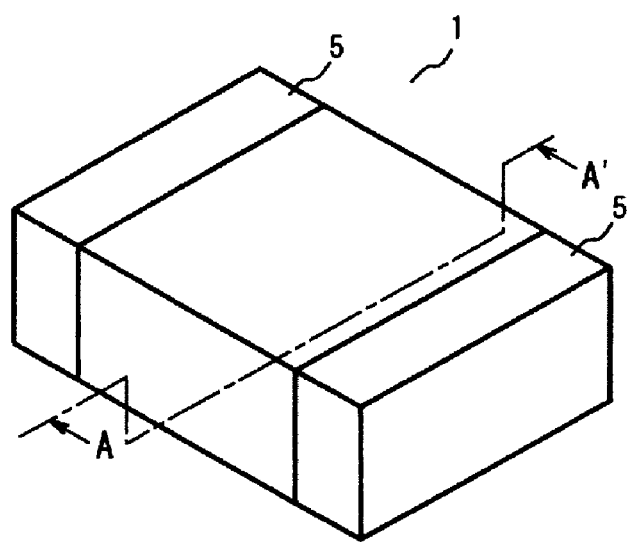
FIG. 1 is a perspective view showing the appearance of the laminated inductor according to one embodiment of the present invention.
Figure 2:
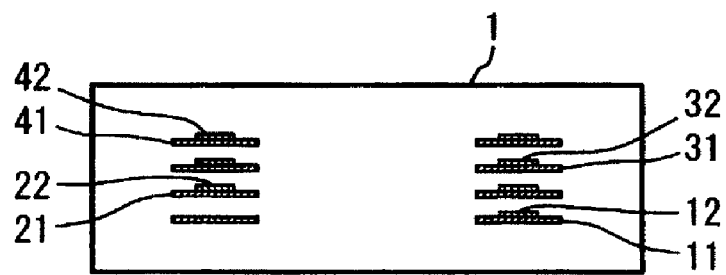
FIG. 2 is a cross-sectional view taken along the line A-A' in FIG. 1.

FIG. 1 shows the appearance of the laminated inductor according to the first embodiment of the present invention, FIG. 2 is a cross-sectional view taken along the line A-A' in FIG. 1, and FIGS. 3-7 show its production steps. The laminated inductor in this embodiment comprises a coil embedded in a ferrite laminate, both ends of the coil being connected to external electrodes 5 formed on a laminate surface by baking a conductive paste of Ag, etc. As shown in FIG. 2, non-magnetic ceramic layers 11, 21, 31, 41 are in contact with coil-constituting conductor patterns 12, 22, 32, 42. The conductive paste for forming external electrodes is not particularly restricted, but may be, for instance, an Ag alloy containing at least one of Pt, Pd, Au, Cu and Ni, etc.

The magnetic ferrite layer is made of, for instance, a ferrite composition comprising $Fe_2O_3$, ZnO and NiO, part of which may be substituted by CuO, as main components. The main component composition preferably comprises 47-50.5% by mol of $Fe_2O_3$, and 19-30% by mol of ZnO, the balance being NiO, 15% or less by mol of which may be substituted by CuO.

The inclusion of 47-50.5% by mol (calculated as $Fe_2O_3$) of Fe in the ferrite composition is to obtain a high saturation magnetic flux density Bs without reducing magnetic permeability. When Fe is less than 47% by mol, the desired magnetic permeability and saturation magnetic flux density cannot be obtained. When Fe is more than 50.5% by mol, the magnetic ferrite layer has low resistance because of increased $Fe^{2+}$.

The inclusion of 19-30% by mol (calculated as ZnO) of Zn in the ferrite composition is to obtain a high saturation magnetic flux density. When Zn is less than 19% by mol, the desired magnetic flux density cannot be obtained. When Zn is more than 30% by mol, the Curie temperature is lower than a practically acceptable range. The amount of Ni is a remainder of the subtraction of $Fe_2O_3$ and ZnO from the main component composition, and part of Ni may be substituted by 15% or less by mol (calculated as CuO) of Cu for low-temperature sintering. To obtain a high saturation magnetic flux density as well as the desired magnetic permeability, a NiO/CuO molar ratio is preferably 0.3-5.8.

The ferrite composition may contain, as a sub-component, at least one selected from the group consisting of 0.01-1% by mass (calculated as $Nb_2O_5$) of Nb oxide, 0.01-1.5% by mass, particularly 0.1-1% by mass (calculated as $Ta_2O_5$) of Ta oxide, 0.1-1.5% by mass (calculated as $V_2O_5$) of V oxide, 0.01-2% by mass, particularly 0.1-1.5% by mass (calculated as $TiO_2$) of Ti oxide, 0.1-1.5% by mass (calculated as $Bi_2O_3$) of Bi oxide, 0.1-1.5% by mass (calculated as $CO_3O_4$) of Co oxide, 0.1-1.5% by mass (calculated as $SnO_2$) of Sn oxide, 0.1-1.5% by mass (calculated as CaO) of Ca oxide, and 0.1-1.5% by mass (calculated as $SiO_2$) of Si oxide.

When 0.01-1% by mass (calculated as $Nb_2O_5$) of Nb is contained, the crystal grain size is controlled. When 0.01-1.5% by mass (calculated as $Ta_2O_5$) of Ta is contained, the resistivity is improved. When 0.1-1.5% by mass (calculated as $V_2O_5$) of V is contained, the low-temperature sintering is accelerated. When 0.01-2% by mass (calculated as TiO) of Ti is contained, the resistivity is improved. When 0.1-1.5% by mass (calculated as $Bi_2O_3$) of Bi is contained, the low-temperature sintering is accelerated, and the resistivity is improved. When 0.1-1.5% by mass (calculated as $CO_3O_4$) of Co is contained, the high-frequency loss is reduced. When 0.1-1.5% by mass (calculated as $SnO_2$) of Sn is contained, the hysteresis loss is reduced. When 0.1-1.5% by mass (calculated as CaO) of Ca is contained, the grain growth is suppressed. When 0.1-1.5% by mass (calculated as $SiO_2$) of Si is contained, the grain growth is suppressed.

An excessive amount of the sub-component hinders the low-temperature sintering, and lowers the sintering density and mechanical strength (bending strength). On the other hand, too small an amount of the sub-component fails to provide sufficient effects. The sub-components may be added alone or in combination. When added in combination, the total amount is preferably 5% by mass or less. When the total amount is more than 5% by mass, the sinterability is likely hindered.

The amount of inevitable impurities such as Na, S, Cl, P, W, B, etc. contained in the starting materials is preferably as small as possible, more preferably 0.05% by mass or less.

The amounts of the main components and the sub-components in the ferrite composition are measured by X-ray fluorescence analysis and ICP atomic emission spectrometry. The contained elements are first identified by X-ray fluorescence analysis, and then quantitatively determined by a calibration method using standard samples.

The starting materials for the ferrite composition are mixed, calcined, and then pulverized. The control of pulverization conditions and the classification of pulverized powder provide ferrite powder having a BET specific surface area of 5-20 m²/g. The same ferrite powder can be obtained by spraying an aqueous solution of each chloride of Fe, Ni and Zn to produce powder, and then calcining it.

The ferrite powder is mixed with an organic binder such as polyvinyl butyral, etc., and a solvent such as ethanol, toluene, xylene, etc., and blended in a ball mill to prepare slurry. With its viscosity adjusted, the slurry is coated on a resin film such as a polyester film by a doctor blade method, etc., and dried to form a magnetic ferrite sheet.

The non-magnetic ceramic layer is formed by powder of at least one non-magnetic ceramic selected from the group consisting of zirconia ($ZrO_2$), zircon ($ZrSiO_4$), alumina ($Al_2O_3$), and mullite ($3Al_2O_3$-$2SiO_2$). The non-magnetic ceramic powder preferably has a BET specific surface area of 5-20 m²/g. When the BET specific surface area is less than 5 m²/g, it is difficult to form a non-magnetic ceramic layer having a thickness of 5 μm or less. On the other hand, when the BET specific surface area is more than 20 m²/g, the paste has too high viscosity to conduct coating easily, and densification proceeds too much in integral sintering with the magnetic ferrite layers, resulting in insufficient relaxation of internal stress. The non-magnetic ceramic powder is preferably $ZrO_2$ powder having an average particle size of 0.5-3 μm.

Cu, Zn and Bi contained in the sintered non-magnetic ceramic layer act as sintering accelerators, densifying the structure. Cu, Zn and Bi may be added in the form of an oxide to a non-magnetic ceramic powder paste, or may be added to the magnetic ferrite layers, such that they are diffused to the non-magnetic ceramic layer during sintering. Among Cu, Zn and Bi, the amount of Bi in the non-magnetic ceramic has smaller influence on magnetic characteristics than those of Cu and Zn, so that its diffusion into the non-magnetic ceramic layer can be easily controlled. However, when too much Bi is added to the non-magnetic ceramic, abnormal sintering may occur.

Each powder is mixed with an organic binder such as ethyl cellulose and a solvent, and the resultant mixture is blended by three rolls to prepare a non-magnetic ceramic paste. Blending may be conducted by a homogenizer, a sand mill, etc. Zn, Cu and Bi accelerating densification may be added in the form of an oxide to the non-magnetic ceramic paste in advance, or may be diffused into the non-magnetic ceramic layer during sintering.

Cu, Zn and Bi contained in the sintered non-magnetic ceramic layer are preferably 3-18% by mass in total based on 100% by mass of the entire non-magnetic ceramic layer. When the total amount of Cu, Zn and Bi is less than 3% by mass, sufficient densification of the non-magnetic ceramic layer is not obtained. When it exceeds 18% by mass, their diffusion into the magnetic ferrite layers occurs remarkably, resulting in the accelerated sintering of ferrite and abnormal grain growth. The abnormal growth of crystal grains causes increase in core loss, etc. Because Cu and Bi are easily diffused, their total amount is more preferably 12% by mass or less.

The sintered non-magnetic ceramic layer is so densified that ceramic grains are not easily detached even by scratching with a scriber, but it has more pores than the magnetic ferrite layer. Accordingly, stress generated by a linear thermal expansion coefficient difference is dispersed in the non-magnetic ceramic layer, so that residual stress applied to the magnetic ferrite layers disappears.

The non-magnetic ceramic is inherently densified by sintering at as high temperatures as about 1300° C., but it is sintered at about 900° C. in the present invention, resulting in pores inside the ceramic and thus insufficient densification. Accordingly, the propagation of cracks generated in the non-magnetic ceramic layer by internal stress is blocked by pores, so that the cracks are turned to discontinuous microcracks, failing to propagate to the magnetic ferrite layer. When the non-magnetic ceramic layer is not exposed outside the laminated inductor, a plating liquid, moisture, etc. do not intrude into the laminated device through pores in the non-magnetic ceramic layer.

FIGS. 3-7 show the steps of forming conductor patterns on magnetic ferrite sheets. A non-magnetic ceramic layer 11 [FIG. 3(b)] is printed on a magnetic ferrite sheet 10 [FIG. 3(a)], and dried. A conductive paste is printed on the non-magnetic ceramic layer 11 to form a conductor pattern 12 [FIG. 3(c)]. Because as large a step as more than 30 μm, which is generated by the formation of the conductor pattern 12, makes pressure-bonding insufficient, delamination is likely to occur. Accordingly, a magnetic ceramic paste having the same composition as that of the magnetic ferrite sheet 10 is printed to cover other portions than the conductor pattern 12, to form a step-removing, magnetic ceramic layer 13 [FIG. 3(d)]. The first composite layer is thus formed [(a) in FIG. 7].

Figure 7:
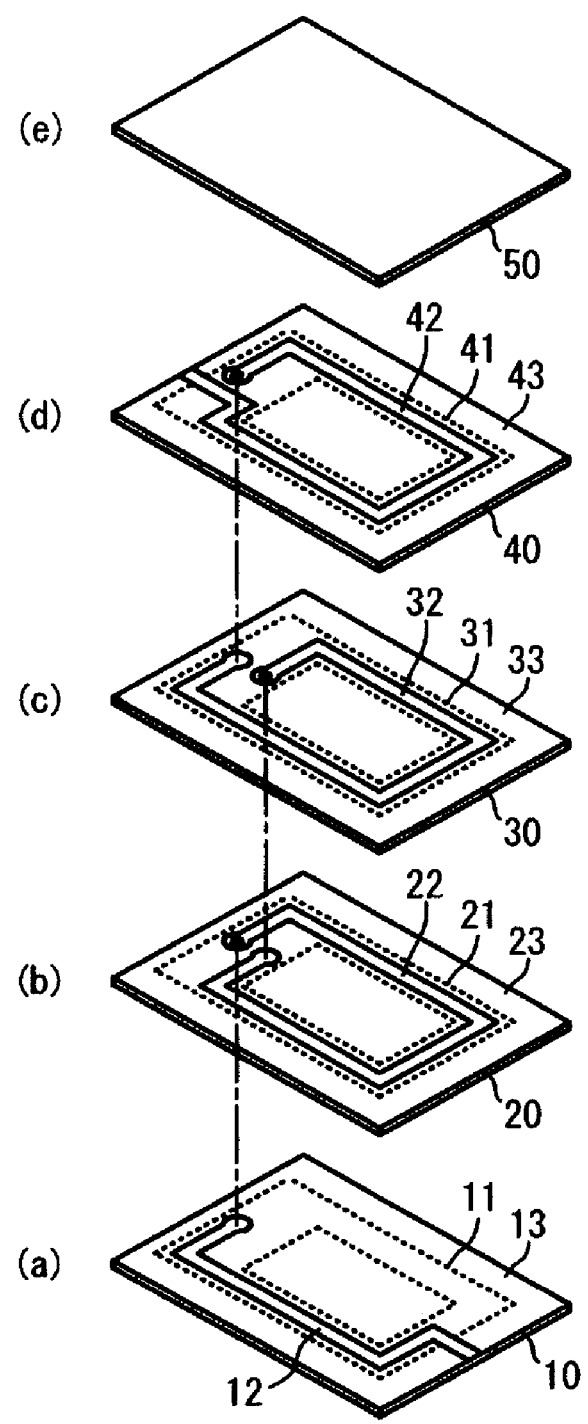
FIG. 7 is an exploded perspective view showing the steps of producing the laminated inductor according to one embodiment of the present invention.

The second to fourth composite layers [(b)-(d) in FIG. 7] have substantially the same basic structures as that of the first composite layer except for via-holes (denoted by black circles in the figures). The via-holes are formed by forming through-holes 27, 37, 47 in the magnetic ferrite sheets 20, 30, 40 by a laser, etc., and printing the non-magnetic ceramic layer 11 having through-holes 25, 35, 45 at positions aligned with the through-holes 27, 37, 47. A conductive paste is printed on the non-magnetic ceramic layer 11 to form a conductor pattern 12, and filled into the via-holes.

The first to fourth composite layers provided with the coil-constituting conductor patterns 12, 22, 32, 42 and the non-magnetic ceramic layers 11, 21, 31, 41 are laminated such that the conductor patterns 12, 22, 32, 42 form a spiral coil, and a magnetic green sheet (dummy layer) 50 is laminated and pressure-bonded to form a laminate. The laminate is cut to a predetermined size (for instance, 3.2 mm×1.6 mm×1.2 mm after sintering), subjected to a binder-removing treatment, and sintered, for instance, at 900° C. in the air. To prevent Cu, Zn, etc. from being deposited on a magnetic ferrite layer in the form of a pure metal or a low-resistance oxide such as $Cu_2O$, $Zn_2O$, etc., at least a highest-temperature-keeping step and a cooling step among the sintering step are preferably conducted in the air or in an atmosphere containing excessive oxygen. Conductor-pattern-exposing surfaces of the sintered body are coated with an Ag-based conductive paste, and baked, for instance, at about 600° C. to form external electrodes, thereby obtaining a laminated inductor.

Figure 34:
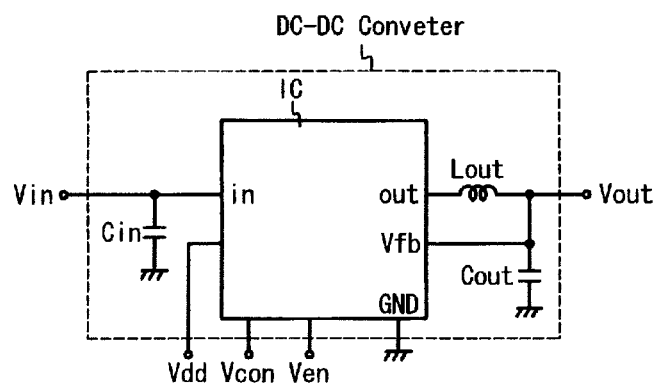
FIG. 34 is a graph showing the equivalent circuit of a step-down DC-DC converter.

The laminated inductor of the present invention in a substrate shape is provided with external terminals used for controlling a semiconductor-integrated circuit device and a mounting electrode on its outer surface. The semiconductor-integrated circuit device is mounted on the mounting electrode, and the coil is connected to provide a DC-DC converter having an equivalent circuit as shown in FIG. 34. Such structure provides the DC-DC converter with stable characteristics, and the existence of the semiconductor-integrated circuit device reduces the mounting area of the DC-DC converter on a circuit board and connecting lines on the circuit board, thereby making an electronic apparatus smaller.

[2] Second Embodiment

Figure 8:
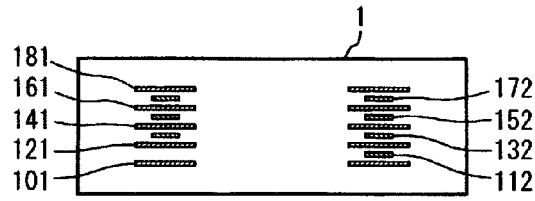
FIG. 8 is a cross-sectional view showing the internal structure of the laminated inductor according to another embodiment of the present invention.

FIG. 8 shows the cross section (corresponding to the cross section taken along the line A-A' in FIG. 1) of the laminated inductor in the second embodiment, and FIGS. 9 to 18 show its production steps. Because the laminated inductor in the second embodiment has the same portions as in the first embodiment, only different portions will be explained in detail below.

In the laminated inductor in this embodiment, non-magnetic ceramic layers 101, 121, 141, 161, 181 are formed between coil-constituting conductor patterns 112, 132, 152, 172. The conductor patterns 112, 132, 152, 172 and the non-magnetic ceramic layers 101, 121, 141, 161, 181 are formed on different magnetic ferrite sheets 100, 110, 120, 130, 140, 150, 160, 170, 180. The conductor patterns are connected through via-holes 127, 137, 147, 157, 167, 177 formed in the magnetic ferrite sheets 120, 140, 160 each provided with a non-magnetic ceramic layer, and in the magnetic ferrite sheets 130, 150, 170 each provided with a conductor pattern. The non-magnetic ceramic layers 121, 141, 161 are provided with through-holes 125, 145, 165.

Figure 18:
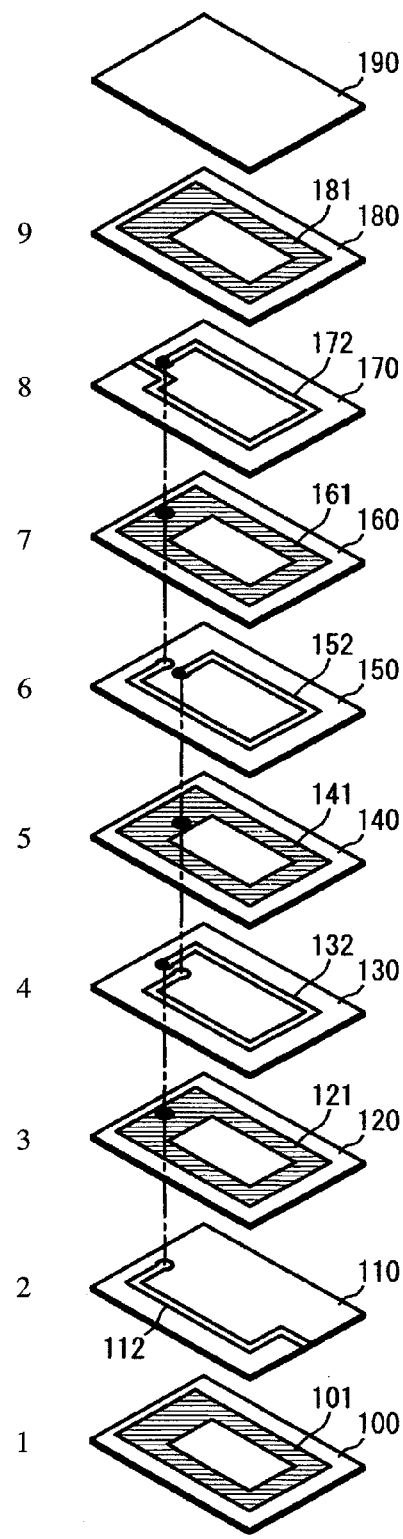
FIG. 18 is an exploded perspective view showing the steps of producing the laminated inductor according to another embodiment of the present invention.

The first to ninth composite layers [1-9 in FIG. 18] provided with coil-constituting conductor patterns and non-magnetic ceramic layers are laminated such that the conductor patterns form a spiral coil, and a magnetic green sheet (dummy layer) 190 is laminated and pressure-bonded to form a laminate.

Because the magnetic ferrite sheet has substantially the same shape, the non-magnetic ceramic layers can be formed with high accuracy, such that each conductor pattern is located in a substantially center portion of each non-magnetic ceramic layer. With each magnetic ferrite sheet as thin as one-half of the thickness in the first embodiment, a laminated inductor having the same thickness as in the first embodiment can be obtained.

[3] Third Embodiment

Figure 19:
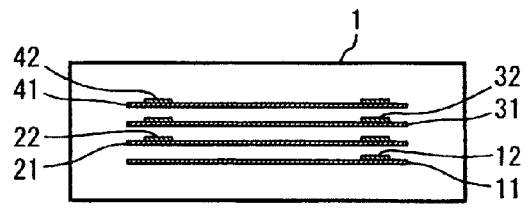
FIG. 19 is a cross-sectional view showing the internal structure of the laminated inductor according to a further embodiment of the present invention.
Figure 20:
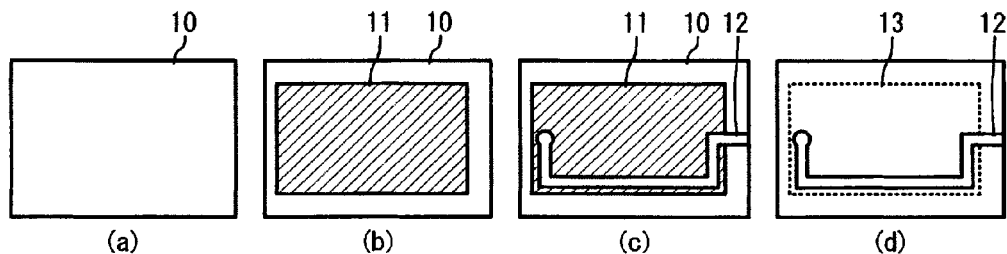
FIG. 20 is a plan view showing the steps of producing one composite layer in the laminated inductor according to a further embodiment of the present invention.

FIG. 19 shows the cross section (corresponding to the cross section taken along the line A-A' in FIG. 1) of the laminated inductor in the third embodiment, and FIG. 20 shows its production steps. In this embodiment, the non-magnetic ceramic layers are formed on an entire coil-covering region (including a region inside the coil). Because the non-magnetic ceramic layers act as magnetic gaps for a magnetic flux in a region inside the coil, the DC superposition characteristics are improved, resulting in high inductance at high frequencies. With respect to other points, the laminated inductor in this embodiment does not differ from that in the first embodiment.

[4] Fourth Embodiment

Figure 21:
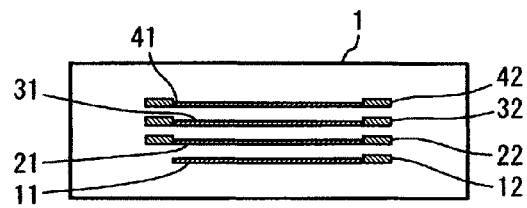
FIG. 21 is a cross-sectional view showing the internal structure of the laminated inductor according to a still further embodiment of the present invention.
Figure 22:
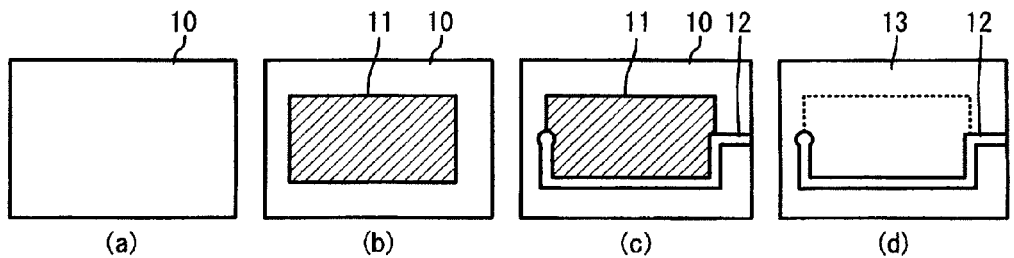
FIG. 22 is a plan view showing the steps of producing a first composite layer in the laminated inductor according to a still further embodiment of the present invention.
Figure 23:
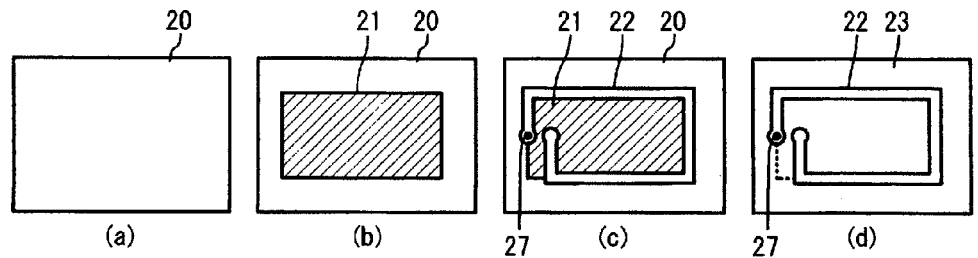
FIG. 23 is a plan view showing the steps of producing a second composite layer in the laminated inductor according to a still further embodiment of the present invention.
Figure 24:
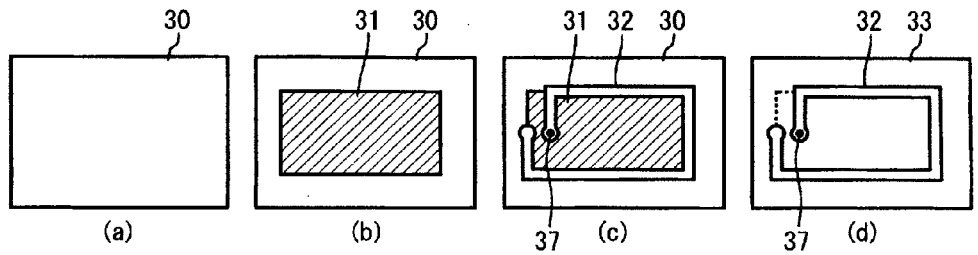
FIG. 24 is a plan view showing the steps of producing a third composite layer in the laminated inductor according to a still further embodiment of the present invention.
Figure 25:
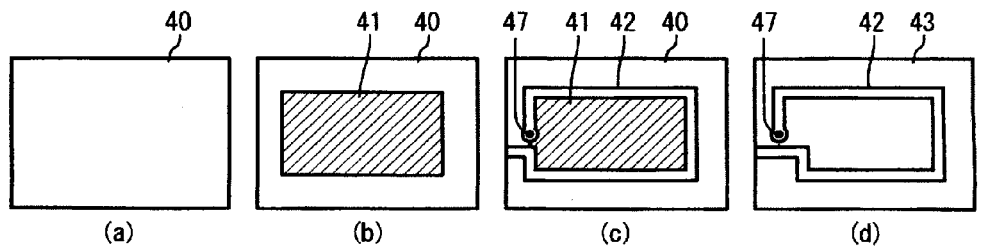
FIG. 25 is a plan view showing the steps of producing a fourth composite layer in the laminated inductor according to a still further embodiment of the present invention.
Figure 26:
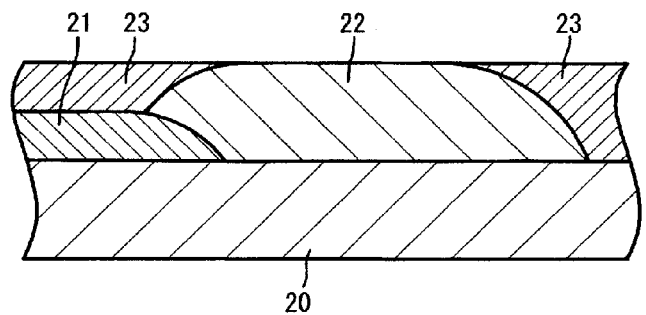
FIG. 26 is a partial cross-sectional view showing the overlapping of a non-magnetic ceramic layer with a conductor pattern in the laminated inductor according to a still further embodiment of the present invention.

FIG. 21 shows the cross section (corresponding to the cross section taken along the line A-A' in FIG. 1) of the laminated inductor in the fourth embodiment, FIGS. 22-25 show the steps of producing first to fourth composite layers for constituting the laminated inductor, and FIG. 26 shows the overlapping of a non-magnetic ceramic layer with a conductor pattern. In this embodiment, non-magnetic ceramic layers are formed on an entire coil-covering region (including a region inside the coil).

As shown in FIG. 26, each non-magnetic ceramic layer 11, 21, 31, 41 and each conductor pattern 12, 22, 32, 42 are formed on each magnetic ferrite sheet 10, 20, 30, 40, such that a peripheral portion of each conductor pattern 12, 22, 32, 42 overlaps a peripheral portion of each non-magnetic ceramic layer 11, 21, 31, 41. This layer structure makes the composite layer thinner, resulting in a thin laminated inductor. In this case, too, the non-magnetic ceramic layers act as magnetic gaps for a magnetic flux in a region inside the coil, resulting in improved DC superposition characteristics, and high inductance at high frequencies. In the depicted embodiment, each conductor pattern 12, 22, 32, 42 is formed on each non-magnetic ceramic layer 11, 21, 31, 41, but the order of formation may be reversed.

[5] Fifth Embodiment

Figure 27:
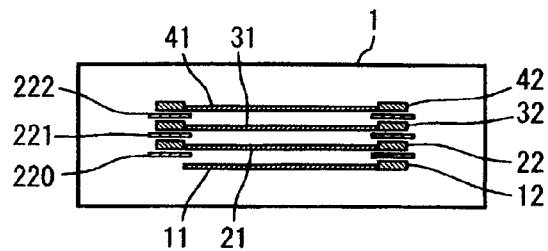
FIG. 27 is a cross-sectional view showing the internal structure of the laminated inductor according to a still further embodiment of the present invention.

Because the fourth embodiment provides a smaller stress relaxation effect than the other embodiments, the fifth embodiment forms, as shown in FIG. 27, non-magnetic ceramic layers 220, 221, 222 such that each conductor pattern is located substantially in a center portion of each non-magnetic ceramic layer. The non-magnetic ceramic layers 220, 221, 222 are formed in the same manner as in the second embodiment. Such structure improves DC superposition characteristics while obtaining a sufficient stress relaxation effect, and reduces the height of the laminated inductor.

The present invention will be explained in further detail by Examples below without intention of restricting the present invention thereto.

Examples 1-7

Comparative Example 1

100% by mass of main components comprising 47.5% by mol of $Fe_2O_3$, 19.7% by mol of NiO, 8.8% by mol of CuO, and 24.0% by mol of ZnO were wet-mixed with sub-components comprising 1% by mass of $Bi_2O_3$, 0.08% by mass of $CO_3O_4$, 0.5% by mass of $SnO_2$, and 0.5% by mass of $SiO_2$, dried, and then calcined at 850° C. for 2 hours. The calcined body was wet-pulverized by a ball mill for 20 hours, to form calcined ferrite composition powder having a BET specific surface area of 7.0 $m^2/g$.

This calcined powder was blended with polyvinyl butyral and ethanol in a ball mill to form slurry. With its viscosity adjusted, the slurry was coated on a polyethylene terephthalate (PET) film by a doctor blade method, and dried to produce three types of magnetic ferrite sheets of 15 μm, 30 μm and 60 μm, respectively, in thickness.

Three types of zirconia ($ZrO_2$) powder having an average crystal grain size of 0.4 μm, 0.5 μm and 2.3 μm, respectively, were prepared as non-magnetic ceramic powder, and each powder was mixed with ethyl cellulose, butyl carbitol acetate and ethanol, and blended by three rolls to prepare a non-magnetic ceramic paste.

A non-magnetic ceramic layer and a conductor pattern of an Ag-based conductive paste were formed on a magnetic ferrite sheet in three patterns shown in Table 1, to produce magnetic sheets shown in FIGS. 3-6 and FIGS. 9-17. To provide constant gap to the conductor patterns, the thickness of the magnetic ferrite sheet was changed. In order that portions free from conductor patterns and a non-magnetic ceramic layer had the same thickness as that of the other portions in any samples, dummy layers formed on above and blow the coil were as thick as 15 μm, 30 μm or 60 μm depending on the sheet patterns.

TABLE 1

Figure 3:
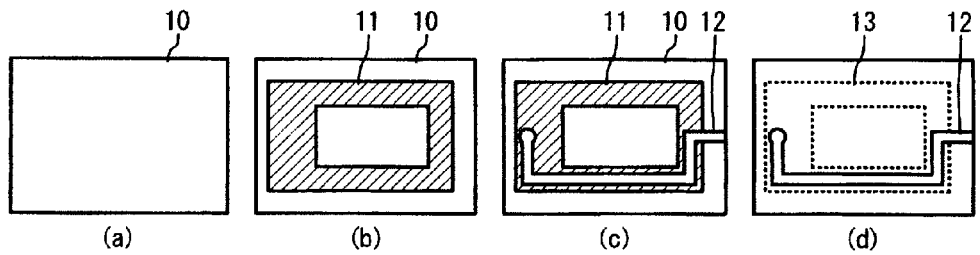
FIG. 3 is a plan view showing the steps of producing a first composite layer in the laminated inductor according to one embodiment of the present invention.
Figure 4:
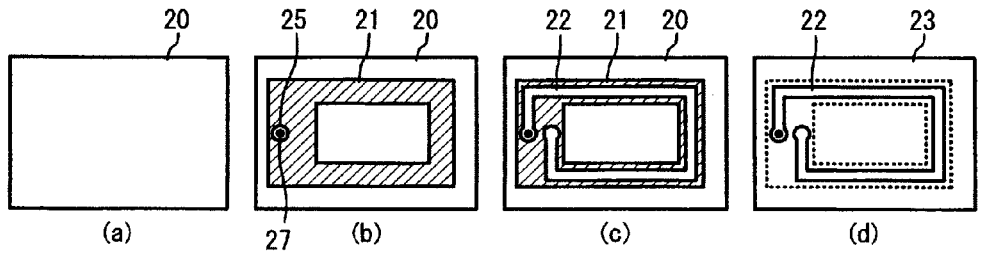
FIG. 4 is a plan view showing the steps of producing a second composite layer in the laminated inductor according to one embodiment of the present invention.
Figure 5:
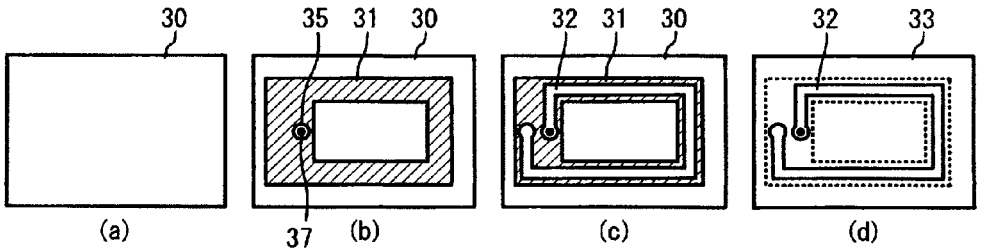
FIG. 5 is a plan view showing the steps of producing a third composite layer in the laminated inductor according to one embodiment of the present invention.
Figure 6:
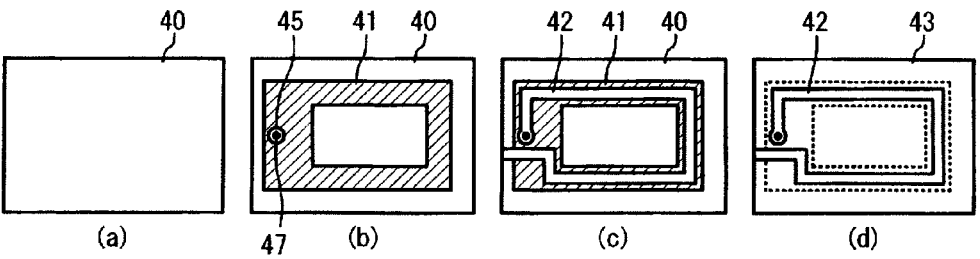
FIG. 6 is a plan view showing the steps of producing a fourth composite layer in the laminated inductor according to one embodiment of the present invention.
Figure 9:
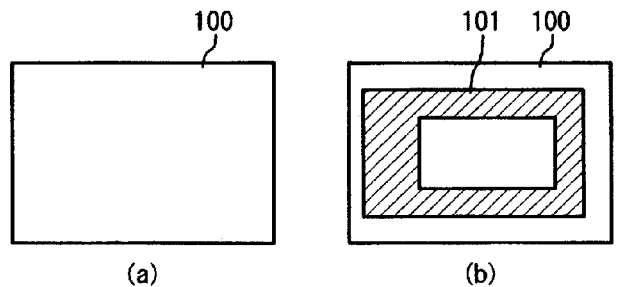
FIG. 9 is a plan view showing the steps of producing a first composite layer in the laminated inductor according to another embodiment of the present invention.
Figure 10:
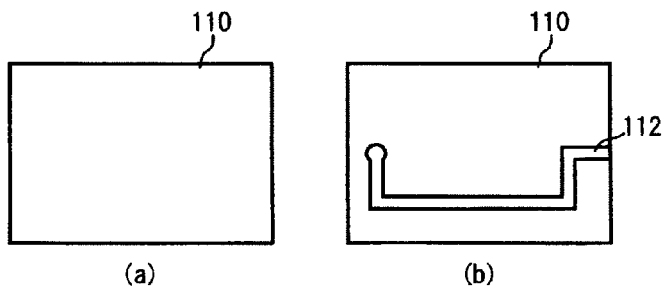
FIG. 10 is a plan view showing the steps of producing a second composite layer in the laminated inductor according to another embodiment of the present invention.
Figure 11:
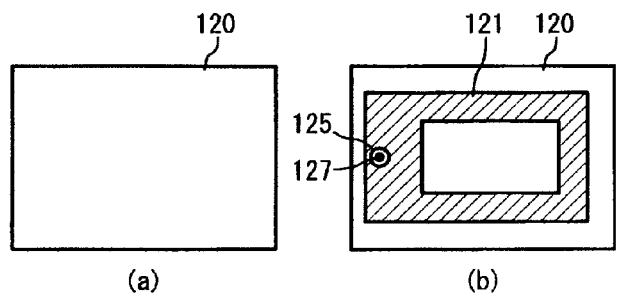
FIG. 11 is a plan view showing the steps of producing a third composite layer in the laminated inductor according to another embodiment of the present invention.
Figure 12:
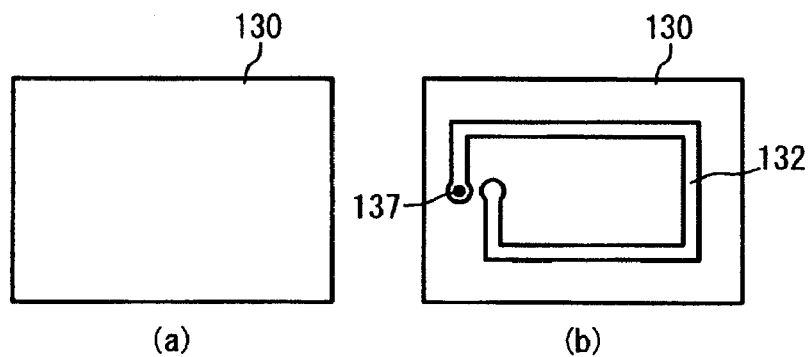
FIG. 12 is a plan view showing the steps of producing a fourth composite layer in the laminated inductor according to another embodiment of the present invention.
Figure 13:
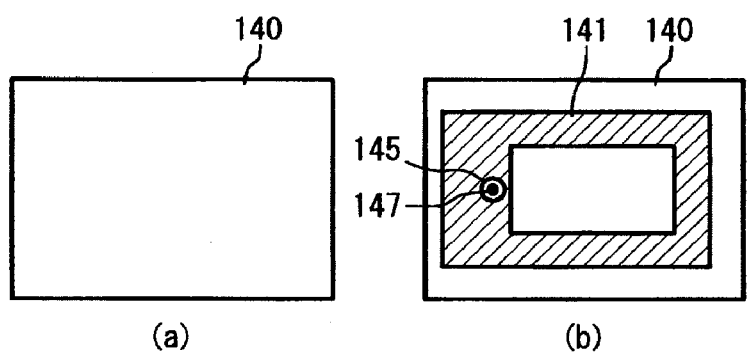
FIG. 13 is a plan view showing the steps of producing a fifth composite layer in the laminated inductor according to another embodiment of the present invention.
Figure 14:
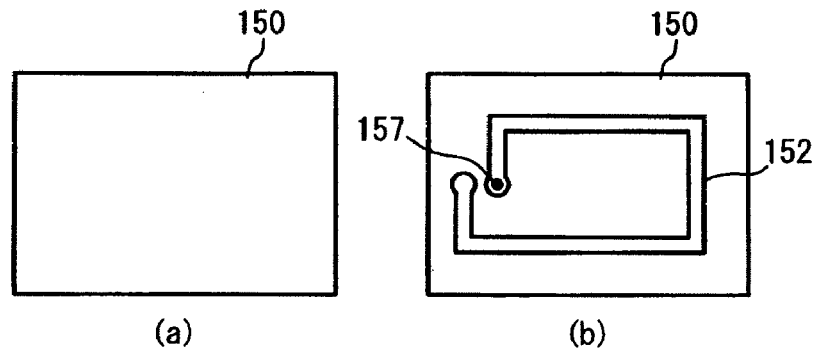
FIG. 14 is a plan view showing the steps of producing a sixth composite layer in the laminated inductor according to another embodiment of the present invention.
Figure 15:
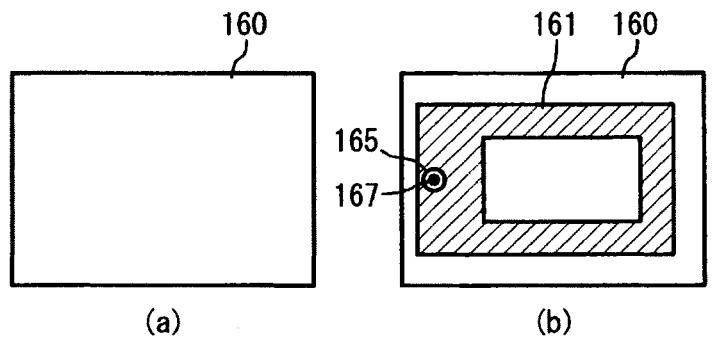
FIG. 15 is a plan view showing the steps of producing a seventh composite layer in the laminated inductor according to another embodiment of the present invention.
Figure 16:
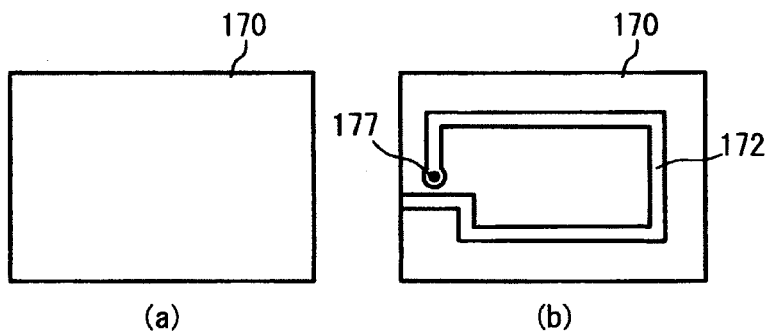
FIG. 16 is a plan view showing the steps of producing an eighth composite layer in the laminated inductor according to another embodiment of the present invention.
Figure 17:
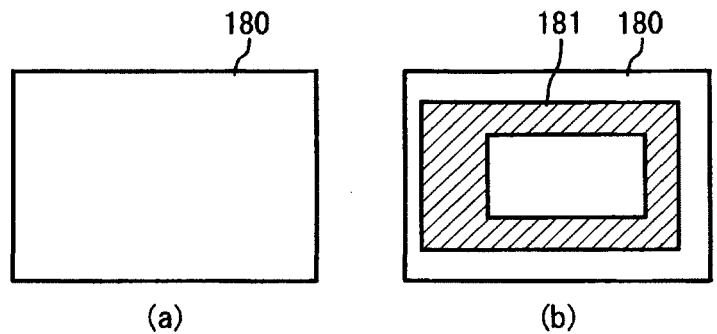
FIG. 17 is a plan view showing the steps of producing a ninth composite layer in the laminated inductor according to another embodiment of the present invention.

| Pattern | Thickness of Magnetic Ferrite Sheet | Non-Magnetic Ceramic Layer[1] | Conductor Pattern | Corresponding Figures |
|---|---|---|---|---|
| A | 15 μm, and 30 μm | — | Width 250 μm Thickness 20 μm | (b) in FIG. 10, (b) in FIG. 12, etc. |
| B | 15 μm | Width 300/900 μm Thickness 10 μm | — | (b) in FIG. 9, (b) in FIG. 11, etc. |
| C | 30 μm | Width 300/900 μm Thickness 10 μm | Width 250 μm Thickness 20 μm | (c) in FIG. 3, (c) in FIG. 4, etc. |

Note:
[1]The left-side number is the width of a narrow portion, and the right-side number is the width of a wide portion.

The resultant composite layers were laminated and pressure-bonded, and each laminate was cut to a size after sintering of 3.2 mm×1.6 mm×1.2 mm. After removing the binder at 600° C., the laminate was sintered at 900° C. for 3 hours in the air. An Ag-based conductive paste was coated on a conductor-pattern-exposing surface of each sintered body, and baked at about 600° C. to form external electrodes. Thus produced were 1000 laminated inductor samples of Examples 1-7 having the internal structures shown in FIGS. 28-32, and 1000 laminated inductor samples of Comparative Example 1 having the internal structure shown in FIG. 33, each containing a coil of 7.5 turns.

Figure 35:
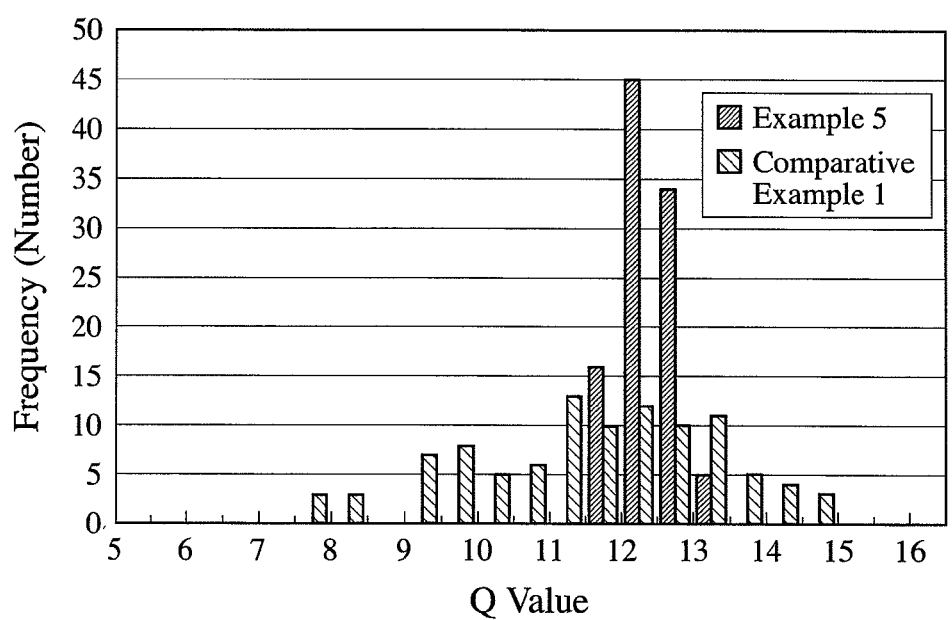
FIG. 35 is a graph showing the frequency distribution of a quality coefficient Q in the laminated inductors of Example 5 and Comparative Example 1.

100 laminated inductor samples were arbitrarily taken out of 1000 samples in each of Examples 1-7 and Comparative Example 1, and their inductance and quality coefficients Q were measured using an impedance analyzer HP4192A available from Hewlett-Packard Company. Further, 10 samples were arbitrarily taken out of 100 samples to produce the step-down DC-DC converters shown in FIG. 34, whose conversion efficiency was evaluated. The results are shown in Table 2 and FIG. 35. FIG. 35 shows the distribution of a quality coefficient Q in Example 5 and Comparative Example 1.

Each sample after the evaluation of characteristics was embedded in a resin, and ground to have an exposed cross section, which was observed by a scanning electron microscope (SEM), and mapped with respect to Cu, Zn and Bi.

TABLE 2

Figure 28:
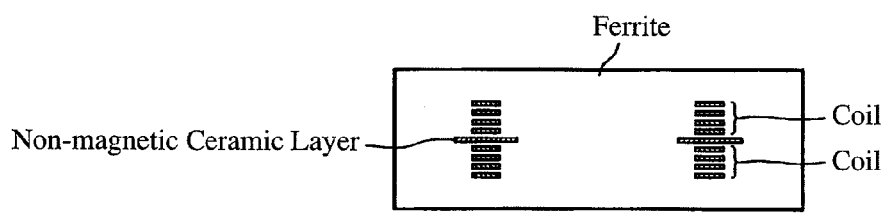
FIG. 28 is a cross-sectional view showing the internal structure of the laminated inductor of Example 1.
Figure 29:
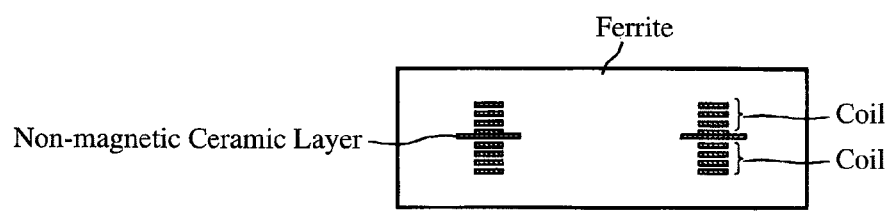
FIG. 29 is a cross-sectional view showing the internal structure of the laminated inductor of Example 2.
Figure 30:
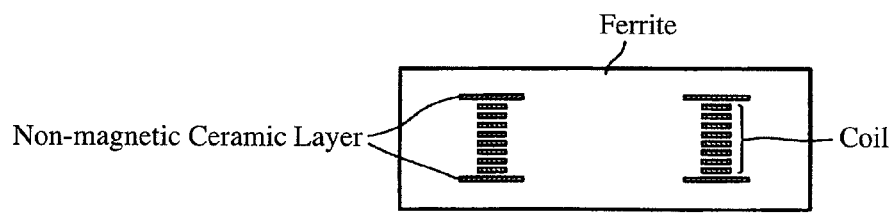
FIG. 30 is a cross-sectional view showing the internal structure of the laminated inductor of Example 3.
Figure 31:
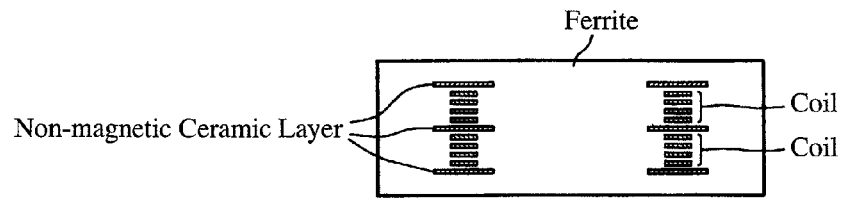
FIG. 31 is a cross-sectional view showing the internal structure of each laminated inductor of Examples 4, 5 and 7.
Figure 32:
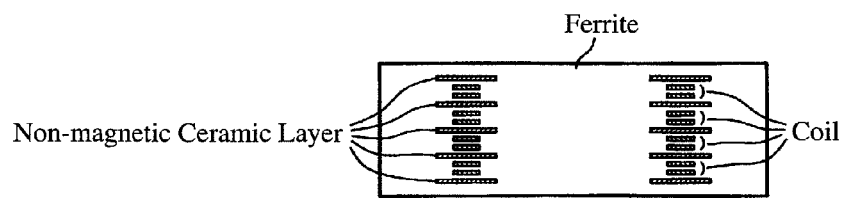
FIG. 32 is a cross-sectional view showing the internal structure of the laminated inductor of Example 6.
Figure 33:
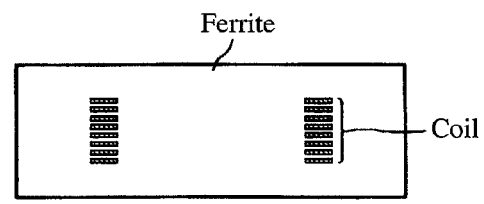
FIG. 33 is a cross-sectional view showing the internal structure of the laminated inductor of Comparative Example 1.

| No. | Non-Magnetic Ceramic Layer Number of Layers | Non-Magnetic Ceramic Layer Average Particle Size (μm) | Inductance Average Value (μH)/Standard Deviation σ | Q Value Average Value/Standard Deviation σ | Internal Structure |
|---|---|---|---|---|---|
| Example 1 | 1 | 0.5 | 10.7/0.022 | 10.7/0.07 | FIG. 28 |
| Example 2 | 1 | 0.5 | 11.5/0.033 | 11.2/0.09 | FIG. 29 |
| Example 3 | 2 | 0.5 | 11.2/0.022 | 9.3/0.04 | FIG. 30 |
| Example 4 | 3 | 0.5 | 10.6/0.036 | 11.9/0.08 | FIG. 31 |
| Example 5 | 3 | 2.3 | 10.3/0.016 | 12.0/0.03 | FIG. 31 |
| Example 6 | 5 | 2.3 | 10.3/0.015 | 11.9/0.03 | FIG. 32 |
| Example 7 | 3 | 0.4 | 11.2/0.040 | 11.0/0.10 | FIG. 31 |
| Comparative Example 1 | — | — | 11.0/0.052 | 11.0/0.14 | FIG. 33 |

| No. | Conversion Efficiency (%) | Cracks |
|---|---|---|
| Example 1 | 79.5-82.2 | Cracks in non-magnetic ceramic layers |
| Example 2 | 79.5-82.0 | Cracks in non-magnetic ceramic layers |
| Example 3 | 80.3-81.1 | Cracks in non-magnetic ceramic layers |
| Example 4 | 81.0-82.1 | Microcracks in non-magnetic ceramic layers |
| Example 5 | 81.6-82.0 | Microcracks in non-magnetic ceramic layers |
| Example 6 | 81.6-81.9 | Microcracks in non-magnetic ceramic layers |
| Example 7 | 78.2-82.0 | Cracks in non-magnetic ceramic layers, and microcracks in magnetic ferrite layers |
| Comparative Example 1 | 77.9-82.1 | Cracks in magnetic ferrite layers |

In Comparative Example 1, 9 out of 10 samples had cracks substantially in parallel with the conductor patterns magnetic in the ferrite layers between the conductor patterns. Cracks were generated mainly in substantially intermediate portions of the magnetic ferrite layers in a thickness direction. On the other hand, the samples of Examples 1-6 had no cracks in the magnetic ferrite layers, though the non-magnetic ceramic layers had microcracks, resulting in smaller unevenness in the inductance and the Q value than in Comparative Example 1. 2 out of 10 samples in Example 7 had microcracks in the non-magnetic ceramic layers and portions of the magnetic ferrite layers very close to the periphery of the non-magnetic ceramic layers. However, the cracks were as small as causing no practical problems, and unevenness in the inductance and Q value was smaller than in Comparative Example 1.

Mapping observation confirmed that Cu, Zn and Bi diffusing from the magnetic ferrite layers were contained in the non-magnetic ceramic layers. The non-magnetic ceramic layer had a composition comprising 83.0% by mass of Zr, 11.5% by mass of Cu, 1.5% by mass of Zn, and 4.0% by mass of Bi.

100 samples separately taken in Example 5 were immersed in a eutectic solder at 400° C. for 3 seconds, to conduct a heat shock test in which inductance and a Q value were measured before and after the immersion. It was thus found that there was no substantial difference in unevenness in the inductance and the Q value between before and after the immersion. 10 samples were arbitrarily taken out of those after the test, and their cross sections were observed by SEM, revealing that the magnetic ferrite layers had no cracks.

EFFECT OF THE INVENTION

The laminated device of the present invention has stable characteristics such as inductance, a Q value, etc., and excellent DC superposition characteristics, with internal-electrode-induced residual stress reduced, and delamination and cracking suppressed. The laminated devices of the present invention having such features are useful as laminated inductors with magnetic gaps, inductor-containing ferrite substrates having electrodes on which semiconductor devices can be mounted, modules obtained by mounting semiconductor devices, reactance devices, etc. on ferrite substrates, etc.

What is claimed is:

1. A laminated device comprising pluralities of magnetic ferrite layers, conductor patterns each formed on each magnetic ferrite layer and connected in a lamination direction to form a coil, and a non-magnetic ceramic layer formed on at least one magnetic ferrite layer such that it overlaps said conductor patterns in a lamination direction, said non-magnetic ceramic layer comprising as main components non-magnetic ceramics having higher sintering temperatures than that of said magnetic ferrite, and further one or more of Cu, Zn and Bi in the form of an oxide, said non-magnetic ceramic layer having more pores than said magnetic ferrite layer.

2. The laminated device according to claim 1, wherein said non-magnetic ceramic layer is in a doughnut shape, at least one periphery of which extends more than the corresponding peripheries of said conductor patterns in a plane direction of said magnetic ferrite layer.

3. The laminated device according to claim 1, wherein said non-magnetic ceramic layer is in a plate shape covering at least a region inside said conductor patterns.

4. The laminated device according to claim 3, wherein said non-magnetic ceramic layer overlaps at least inner peripheral portions of said conductor pattern in a lamination direction.

5. The laminated device according to claim 1, wherein said conductor patterns are completely sandwiched by non-magnetic ceramic layers adjacent in a lamination direction.

6. The laminated device according to claim 1, wherein said non-magnetic ceramic layer is not exposed outside.

7. The laminated device according to claim 1, wherein the connection of said conductor patterns in a lamination direction is achieved by a conductor filled in via-holes of said magnetic ferrite layers and said non-magnetic ceramic layer.

8. The laminated device according to claim 1, wherein said non-magnetic ceramic layer is made of any one of $ZrO_2$, $ZrSiO_4$, $Al_2O_3$, and $3Al_2O_3\text{-}2SiO_2$.

9. The laminated device according to claim 1, wherein said magnetic ferrite is a spinel-type ferrite comprising as main components Fe, Ni and Zn, part of which may be substituted by Cu.

10. The laminated device according to claim 9, wherein said spinel-type ferrite comprises Bi as a sub-component.

11. The laminated device according to claim 1, wherein said non-magnetic ceramic layer has cracks.

* * * * *